Jan. 3, 1967  S. FISCHER  3,295,159
APPARATUS FOR THE MANUFACTURE OF HOLLOW OBJECTS
Filed July 24, 1963  3 Sheets-Sheet 1
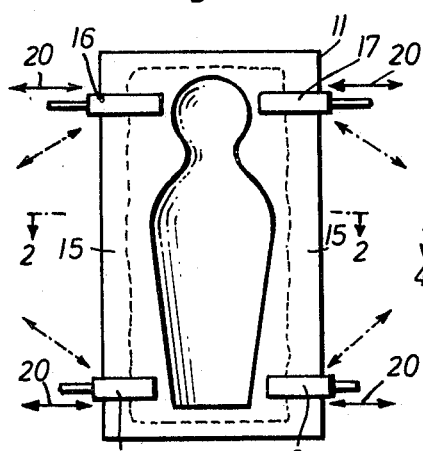
Fig.1
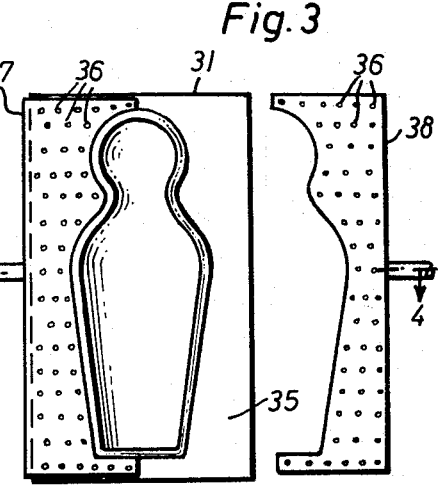
Fig.3
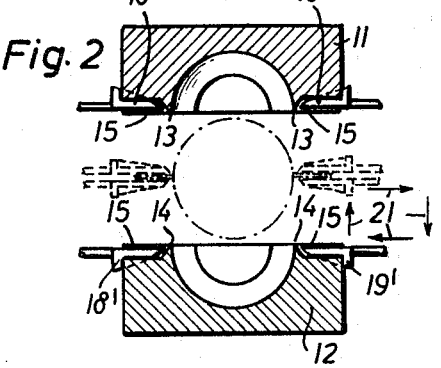
Fig.2
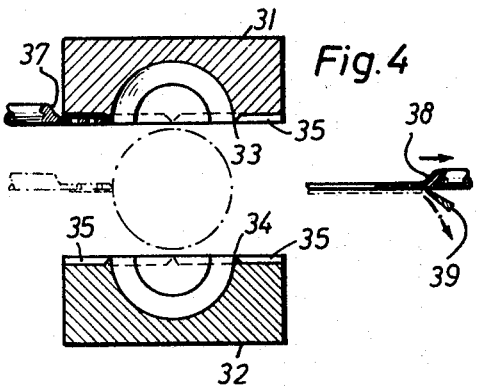
Fig.4
Fig.5
INVENTOR
Stefan Fischer
BY Jan. 3, 1967  S. FISCHER  3,295,159
APPARATUS FOR THE MANUFACTURE OF HOLLOW OBJECTS
Filed July 24, 1963  3 Sheets-Sheet 2
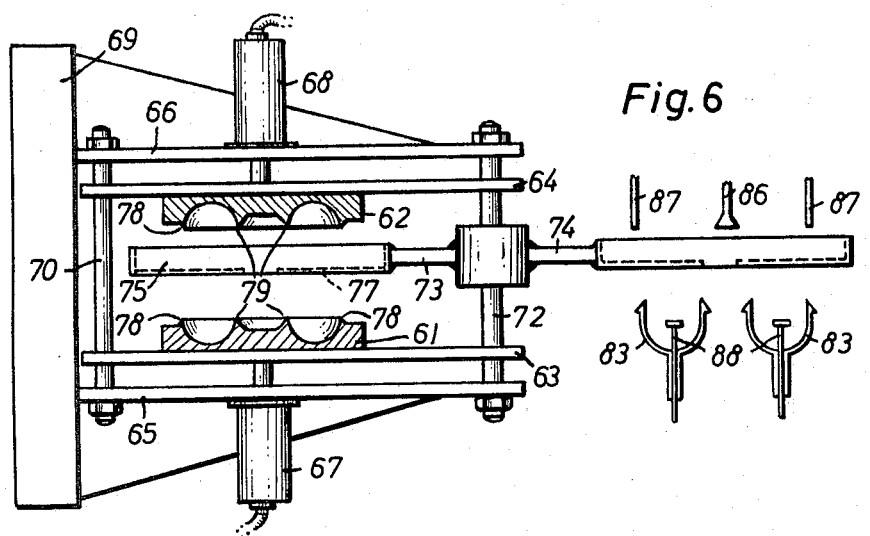
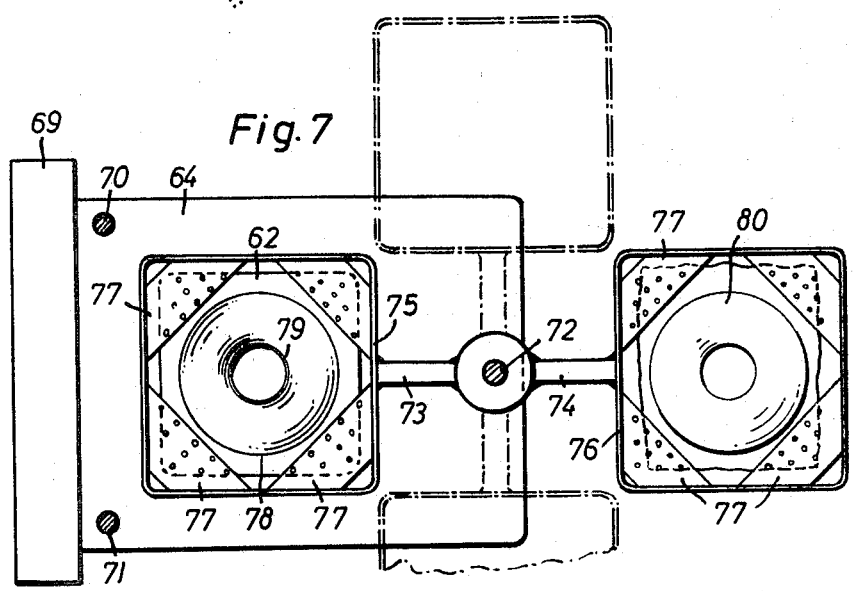
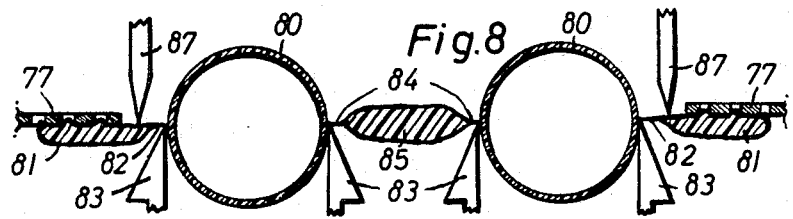
INVENTOR
Stefan Fischer
BY

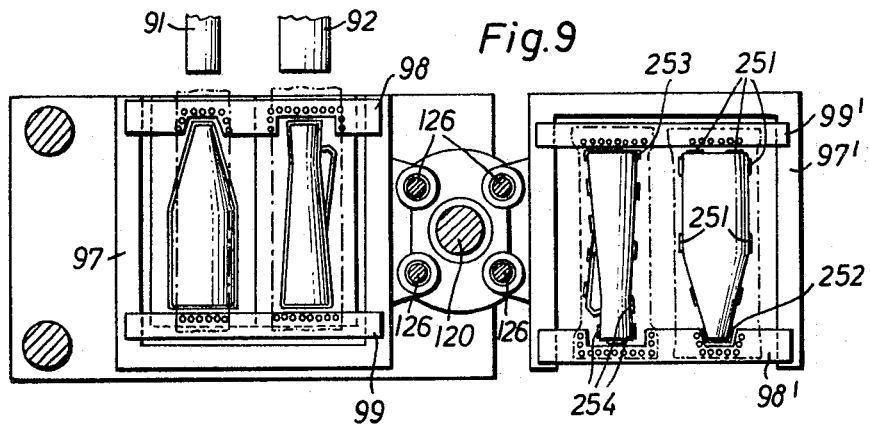
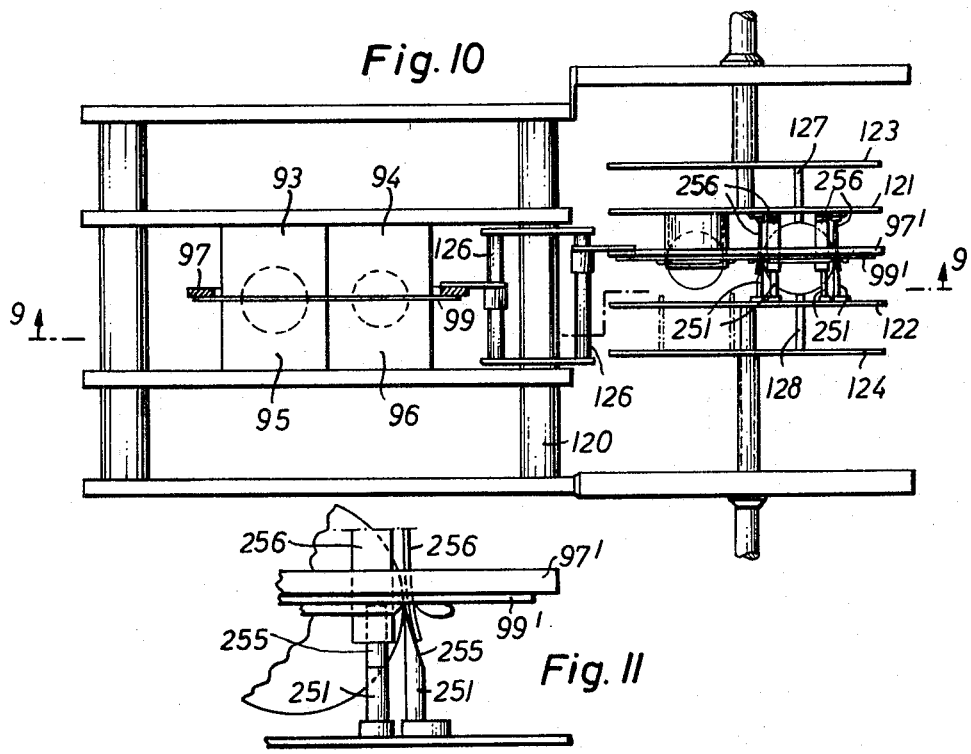
INVENTOR
Stefan Fischer
BY

United States Patent Office 3,295,159
Patented Jan. 3, 1967

3,295,159
APPARATUS FOR THE MANUFACTURE OF
HOLLOW OBJECTS
Stefan Fischer, Lohmar, near Cologne, Germany
Filed July 24, 1963, Ser. No. 297,438
Claims priority, application Germany, July 25, 1962,
F 37,415; Nov. 26, 1962, F 38,393; Feb. 2, 1963,
F 38,911
4 Claims. (Cl. 18—5)

This invention relates broadly to a device for the production of bottles or similar hollow articles from thermoplastic material.

There are, at present, several well-known devices for the production of such hollow plastic articles. Generally, the conventional devices first require the formation of a hollow tube or the like from the thermoplastic material. This hollow tube is then introduced between the halves of a two or more part mold which is closed about the hollow tube. A fluid such as air or steam is then introduced into the central hollow portion of the tube under pressure, expanding it against the internal cavity forming the mold walls. The thermoplastic material is then cooled and hardened thereby forming the finished object. This cooling portion of the cycle will generally be somewhat lengthy.

The multi-part mold when closing about the tube of thermoplastic material will generally cut off the excess portion thereof. For this purpose the internal cavity of the mold is provided with relatively sharp edges to squeeze together the portions of the thermoplastic tube which are surplus, and so that the portions of the thermoplastic tube at the joinder of the molds will be pressed together.

The surplus or squeezed off portions of the tube are, after the hollow object has been formed, removed from the hollow objects generally by a hand operation. This manual operation vastly increases the cost of production of hollow objects of thermoplastic material. This is especially so in that generally the surplus edge portions are relatively tough and difficult to remove.

It is a cardinal object of this invention, therefore, to provide an apparatus for automatic removal of the surplus material surrounding a hollow object after formation of the usual blow-molding process.

Additional objects and accomplishments will be apparent to those skilled in the art by a reading of the detailed specification following hereinafter.

Briefly, the above is accomplished by the expedient of providing a relatively sharp cutoff and grooves about the periphery of each of the mold parts. The grooves will receive the surplus material squeezed from the thermoplastic tube utilized for the formation of the hollow object. Additionally, suitable apparatus will be provided to remove the thermoplastic material from each of the grooves at the completion of each of the molding cycles.

One embodiment of the invention incorporates grippers in the form of plates with holes therein to grip the surplus material during or after the closing of the molds, and removing surplus material prior to the opening of the mold. The surplus material will be urged into the holes respectively in each of the grippers for attachement thereto so that the surplus material will be removed from the molds when the grippers are moved away from the said molds.

A separate wiping device will be provided to remove the surplus thermoplastic material from the grippers at the termination of each of the molding cycles.

An additional embodiment of this invention contemplates the utilization of the grippers and the surplus thermoplastic material to transport the entire blown object by means of the said surplus material to a separate station where the cooling cycle may be completed and the hollow object ejected free from any surplus material. Separate severing and pushing apparatus may be incorporated to facilitate this ejection of the finished product. It will be possible to utilize two, three, four or even more sets of grippers on independent arms operating alternately to more efficiently expedite the production cycle.

With these objects in view, the invention consists of the novel features of construction and arrangement of parts which will appear in the following specification and recited in the appended claims, reference being had to the accompanying drawings in which the same reference numerals indicate the same parts throughout the various figures and in which:

FIG. 1 is an elevational fractional view of one of the mold halves comprising the instant invention.

FIG. 2 is a sectional elevational view taken substantially along line 2—2 of FIG. 1 showing both of the mold halves and the operation of the grippers in phantom.

FIG. 3 is an elevational view of a mold halve corresponding to FIG. 1 but demonstrating a second embodiment of the invention wherein grippers in the form of plates are utilized.

FIG. 4 is a sectional elevational view taken substantially along line 4—4 of FIG. 3 showing both of the molds and a portion of the operation of one of the grippers in phantom.

FIG. 5 is a sectional elevational view corresponding to FIG. 4 but demonstrating a third embodiment of the instant invention wherein a shear blade is utilized to remove the surplus thermoplastic material.

FIG. 6 is a plan view partly in section showing a fourth alternate embodiment of the instant invention.

FIG. 7 is an elevational view of a portion of the device illustrated in FIG. 6.

FIG. 8 is a fragmentary and enlarged view of the portion of the device illustrated at the extreme right of FIG. 6 with parts demonstrated in their operative positions.

FIG. 9 is a view corresponding to FIG. 6 but showing a fifth alternate embodiment of this invention and taken substantially along line 9—9 of FIG. 10.

FIG. 10 is a plan view of the device illustrated in FIG. 9.

FIG. 11 is a fractional and enlarged view of a portion of the device illustrated in FIGS. 9 and 10.

In FIGS. 1 and 2 there is illustrated one simplified and preferred embodiment of the instant invention. It will be realized that many of the features necessary for the completion of a blow-molding process are not shown herein in that they are well known in the prior art. For example, it will first be necessary to extrude a tube or preform of the thermoplastic material. The preform must be inserted between the open mold halves. The open mold halves when closed will have an internal cavity corresponding to the shape of the article to be blown.

The size of the extruded tube or perform is such that the closing molds will press together portions of the same and will cut away surplus portions thereof.

For example, as shown in FIGS. 1 and 2, the mold halves 11 and 12 will each have cutoff edges 13 and 14. On the exterior side of each of the cutoff edges 13 and 14 will be a groove 15. When the mold halves 11 and 12 close about the extruded tube, the surplus material cutoff by the edges 13 and 14 will be urged into the said grooves 15.

At the completion of the blowing and the cooling cycle (not illustrated herein) the finished hollow object will be ejected from the mold halves 11 and 12. There remains, however, the problem of removing the surplus thermoplastic material from each of the grooves 15. For this purpose, grippers 16, 17, 18 and 19 are provided. Each of the said grippers 16, 17, 18 and 19 will be provided with automatic mechanisms to move each of the said grippers in the direction of the arrows shown at 20 and 21. Essentially, this movement will be in and out of each of the mold halves 11 and 12. In the alternative, however, each of the grippers may move in the direction of the arrows shown in phantom adjacent the solid arrows 20. Additionally, it is to be noted, that the grippers may be actuated simultaneously with the closing of the molds or immediately thereafter. Further, the pairs of grippers may be provided at any convenient portion at each of the molds 11 and 12, and there may be any number of such pairs of grippers.

The surplus material cutoff by the edges 13 and 14 will become impinged upon the tips of the grippers 16, 17, 18 and 19 and will adhere thereto. Thus, when the said grippers 16, 17, 18 and 19 are retracted or withdrawn from the mold halves 11 and 12, generally when the said mold halves are still closed as shown in phantom in FIG. 2, the surplus material adhering thereto will be removed from the said grooves 15 and thus from the hollow object being formed.

It will be seen then that this simplified but efficient embodiment of the instant invention accomplishes a novel object never heretofore available. The surplus material squeezed or pinched off by the cutoff edges of the mold 13 and 14 will be removed from the finished hollow objects prior to the removal of the hollow object from the said mold halves 11 and 12. As was stated heretofore, this could only be accomplished in the prior art by a manual operation.

Shown in FIGS. 3 and 4 is a second alternate embodiment of the instant invention. In this embodiment, as before, there is provided a pair of mold halves 31 and 32 with cutoff edges 33 and 34 for the removal of the excess or surplus material from the extruded or preformed tube to be blown. A groove 35 is provided on the outward side of each of the cutoff edges 33 and 34.

As illustrated, at least one plate 37 and 38 is provided in each of the pair of grooves 35. The said plates may, if desired, be fabricated of sheet metal or the like, and will be somewhat thinner than the lateral width of the grooves 35 so as to be capable of movement either into or out of each of the pair of grooves 35, as desired. A suitable mechanism (not illustrated) will be provided to automatically move each of the plates 37 and 38 into and out of the corresponding pair of grooves 35. Each of the plates 37 and 38 will be adapted for movement to a point in contact with or immediately adjoining the cutoff edges 33 and 34.

In the illustrated embodiment of the invention, two plates 37 and 38 are illustrated for each pair of mold halves. It will be realized, however, that in place of the two plates, each covering one half of the circumference of the object to be molded, there may be provided any number of such individual plates to surround the total circumference.

Each of the plates 37 and 38 will be provided with a plurality of apertures 36. The said apertures 36 may vary in size, position and number as desired. For example, it is even contemplated that only one relatively large aperture may be provided in each of the plates 37 and 38.

When the mold halves 31 and 32 close about the extruded tube or preform each of the plates 37 and 38 will be located within its corresponding groove 35 as, for example, the shown plate 37 in FIG. 4. When the said mold halves 31 and 32 completely close, the cutoff edges 33 and 34 will squeeze the excess thermoplastic material into the grooves 35 and therefore at least partially about a portion of each of the plates 37 and 38. As each of the said plates contain apertures at least a portion of this excess thermoplastic material will partially enter some of the said apertures and therefore become intermingingly attached to each of the said plates 37 and 38. When the formation of the finished product is completed, the plates 37 and 38 will be removed from the grooves 35 by the mechanism mentioned hereinabove. The surplus material or flash having been intermingingly joined to the said plates 37 and 38, will move in conjunction with the said plates and will thus be removed from the finished hollow product and the grooves 35. When the mold halves 31 and 32 then open, the finished product may be ejected without any surplus material or flash adhering thereto as is usual in the conventional devices.

There remains, however, to remove the surplus or excess material from each of the apertured plates 37 and 38. As illustrated in FIG. 4, this may be easily accomplished by one or more scraper blades 39. The scraper blades may be moved against each of the plates 37 and 38 in a direction as indicated by the phantom arrow in FIG. 4 or alternately each of the said plates may be moved against the said scraper blade 39.

It will be seen then that the second alternate embodiment of the instant invention accomplishes the object previously set forth and others. The utilization of the apertured plates 37 and 38 in the grooves 35 surrounding the mold cutoff will serve to grip the excess or surplus material and remove the same from the hollow object being formed.

There is shown in FIG. 5 a portion of a third alternate embodiment of the instant invention.

FIG. 5 is a sectional elevational view with the mold halves 51 and 52 shown in a position corresponding to that of either FIG. 2 or FIG. 4 after the mold halves have closed.

As before, each of the mold halves 51 and 52 will be provided with a cutoff edge 53 and 54. In this embodiment, however, grooves 56 and 57 are provided at the external side of each of the cutoff edges 53 and 54.

As will be seen, at least one blade 58 is located in each of the grooves 56. The said blades 58 will be adapted for axial movement and may each be actuated by its own pusher bar which, in turn, may be commonly connected to a pusher plate 61.

Suitable springs 60 are provided to bias the blades 58 within the grooves 56 except when the pusher plate 61 is urged in the direction of the mold halve 51.

Thus, the operation of the third embodiment of the invention will be apparent. The mold halves 51 and 52 are closed about the extruded tube or preform of thermoplastic material. After the cutoff edges 53 and 54 squeeze off the excess material into the gap 55 between the mold halves 51 and 52, the pusher plate 61 will be automatically depressed in the direction of the mold halve 51. This, in turn, will cause each of the blades 58 to pass along the cutoff edges 53 and 54 and travel into the grooves 57. In so doing, the said blades 58 will, of course, sever the excess or surplus material within the grooves 55. The excess or surplus material will now be free to fall from the groove 55. Thus, when the mold halves 51 and 52 are opened, the finished product may be ejected therefrom without any excess or surplus thermoplastic attached thereto.

It will be preferable to supply a sufficient number of assemblies and blades 58 to sever the excess or surplus material into a sufficient number of relatively small units so that they will not hang up within the said groove 55.

The remainder of the apparatus required for the proper operation of this embodiment and the fabrication of the hollow blown object is not herein shown or described as it too, of course, will be relatively conventional.

There is disclosed in FIGS. 6, 7 and 8 an additional embodiment of the invention. This embodiment in addition to the advantages and features previously set forth, will have the additional important advantage of speeding and making more efficient the production cycle of any of the known blow-molding machines.

Again as in the prior embodiments, only the mechanism necessary for the accomplishment of the invention are shown and described herein. The other conventional features such as the extruder, etc., are not set forth.

In the illustrated embodiments there is shown the production of two blow units side by side simultaneously. For this purpose, a pair of mold halves 61 and 62 are provided; each having a pair of internal cavities. The mold halves 61 and 62 are each attached to a mold retaining plate 63 and 64. Adjacent the mold retaining plates 63 and 64 will be a pair of system support plates 65 and 66. Mounted on the system support plates 65 and 66 will be a pair of actuating cylinders 67 and 68. A vertical standard 69 is provided to support the system support plates 65 and 66 and through these members the remainder of the mechanism. Rigidly interconnecting the system support plates 65 and 66 will be at least three guide rods 70, 71 and 72. The said guide rods 70, 71 and 72 will serve the additional function of supporting the mold retaining plates 63 and 64 which are free to ride thereon on suitable bearings, not illustrated.

Additionally, as will be seen in FIG. 7, the guide rod 72 will function to rigidly support arms 73 and 74. Although two such arms 73 and 74 are illustrated herein, it is to be noted that additional arms may be provided. For example, in FIG. 7 in phantom there are shown two additional arm making a total of four. However, any number of arm may in fact be incorporated such as three, five, six, etc.

The external ends of each of the arms 73 and 74 will support a frame 75 and 76. The frames 75 and 76 in turn, will each have four apertured plates 77 thereon. Atlhough four apertured plates 77 are herein disclosed on each of the frames, of course, any number of apertured plates may in fact be utilized for any desired purpose.

The guide rod 72 and the arms 73 and 74 supported thereon, are positioned and arranged so that each of the frames 75 and 76 may in turn be located centrally of the pair of mold halves 61 and 62. When either of the said frames 75 and 76 are in position between the said mold halves 61 and 62, the apertured plates 77 thereon will be located about the cutoff edge 78 of the said molds.

As will be evident, the arms 73 and 74 may be rotated on the bar 72 only when the mold halves 61 and 62 are separated.

As in the prior embodiments, a groove is provided on the exterior side of each of the cutoff edges 78. The apertured plates 77 when in position between the mold halves 61 and 62 will fit within the said grooves. The said apertured plates 77 when in that position will absorb the excess squeezed thermoplastic material as in the prior embodiments.

The operation of this additional embodiment of the invention is as follows:

After the apertured plates 77 on one of the frames 75 are moved to their operative position between the mold halves 61 and 62, and the extruded tube or preform is in position between the said mold halves, the mold halves will close. The excess or surplus material will be squeezed together by the cutoff edges 78 provided on the molds. The said excess or surplus material will move together and partially into the apertured plates 77 and will thereby become fastened and adhere thereto. The tube will then be blown in the conventional manner into the shape of the internal cavity of the now closed mold. The thermoplastic material will then be allowed to cool and harden. As is well known, certain thermoplastic materials such as polyethylene, are excellent insulators and will retain their latent heat for relatively long periods of time even though surrounded by a relatively frigid environment. This necessarily long cooling cycle, required to cool materials such as polyethylene, considerably slows the machine production cycle. It of course, would be desirable to remove the blown object prior to the completion of its cooling and allow the same to cool away from the machine molds while permitting the molds to form another object. This, at present, is considered impossible in that the removal of an object from a mold prior to the completion to the cooling and hardening cycle will generally result in injury to the product.

This embodiment of the invention in addition to removing the excess or surplus material as in the prior embodiments, permits the removal of the blown object from the forming molds prior to the completion of the cooling cycle by grasping the said object by the said surface material. After the blown object has entirely cooled away from the mold halves the excess or surplus material will be removed from the blown object as in the prior embodiments.

Referring to FIG. 7, this may be accomplished by separating the mold halves 61 and 62 after the object blown therein has only partially cooled. The blown object, however, will still be held in position although no longer contacted by the mold halves themselves, by the apertured plates 77 adhered to their excess or surplus material. The arm 73 will then be rotated 180 degrees to the position occupied by arm 74 in FIG. 7. Of course, if four such assemblies are provided as was heretofore mentioned, the arms 73 will be only rotated 90 degrees. The blown object, although only partially cooled, and not completely set will not be injured in that they will not be contacted at any of their finished parts during this retaining and transporting operation. The first hollow object, together with the excess or surplus material, will be allowed to cool while in the position of the arm 74 of FIG. 7. During the completion of the cooling and hardening cycle any additional operations may be carried out on the finished product if desired.

In the interim, a freshly extruded tube of thermoplastic material or preform may be inserted between the now empty mold halves 61 and 62 and the other frame and aperture plates 77 placed in position to commence another cycle. Thus, two, three, four or even more cycles may be simultaneously carried out when utilizing the mechanism of the instant invention.

At the completion of the cooling cycle, however, the finished blown objects 80 may be automatically removed from the plates 77 as will be explianed hereinafter by reference to FIG. 8 and the right hand portion of FIG. 6.

A pair of double knife structures will be provided in operative position with each of the frames 75 and 76 when away from the mold halves 61 and 62. These double knife structures 83 will be adjustably positioned and automatically actuated so as to move around the edges of the finished blown objects 80 as illustrated in FIG. 8. When the double knife structures 83 are so actuated they will sever the bridges 82 and 84 of thermoplastic material connecting the finished blown hollow objects 80 with the body of the excess or surplus material 85. Pusher bars 88 may then be automatically actuated to eject the finished hardened hollow blown objects 80. Pusher bar 86 in turn may be utilized to eject the surplus or excess material 85 interconnecting the finished blown hollow objects 80 in an opposite direction. Pusher bars 87 additionally will serve to squeeze the additional excess material 81 from the apertured plates 77.

It will be evident, that the finished blown hollow objects 80 now cooled and with all surplus and excess material removed, will fall to one side and may be collected for use. The flash or excess or surplus material will in turn, fall to the other side and may be collected to be reground and reused or otherwise as desired.

The operating cycle of this improved device will be somewhat faster and more efficient that in any of the prior art units in that the blown object does not of necessity have to be cooled within the mold, and when delivered from the machine will have all excess or surplus material removed therefrom.

Referring now to FIGS. 9, 10 and 11, there will be seen a further improved embodiment of the inventive concepts herein disclosed.

This embodiment may be utilized for fabricating a plurality of objects simultaneously; each of the said objects being of different shape and/or size. For example, in the illustrated embodiment, there is shown the production of a vase and a decanter simultaneously.

In FIG. 9 there is shown a fraction of extruded tubes 91 and 92 just prior to insertion between the open halves of molds 93, 95 and 94 and 96. When the mold halves 93 and 95, and 94 and 96 close about the extruded tubes 91 and 92 the excess or surplus material is squeezed by the cutoff edges into grooves divided in the said mold halves as in the prior embodiments of this invention set forth herein. As in the prior embodiments additionally, apertured plates 98 and 99 are provided in the said grooves to receive the said excess or surplus material and to grip the same by allowing portions of the said material to be pass within the said apertures. After the finished articles have been blown and partially the mold halves 93, 95 and 94 and 96 will open. The blown objects will, however, be held in place by the apertured plates 98 and 99 adhered to the surplus or excess material still a part of the blown object.

The apertured plates 98 and 99 will be supported by frame 97 which, in turn, will be supported and may, therefore, be swung around bar 120. As will be seen then the apertured plates 98 and 99 together with the surplus or excess material and the finished product will be rotated about 120 to the position shown to the right in FIG. 9.

Thus, the hollow object supported by the surplus or excess material may finish its cooling cycle when in the position shown to the right in FIGS. 9 and 10, and when away from the molds 93, 94, 95 and 96. This position will be referred to hereinafter as the alternate station.

The alternate station of the machine is provided with two pairs of plates 121 and 122, and 123 and 124. Plates 123 and 124 which are fixed in position will be referred to herein as the outer plates and movable plates 121 and 122 will be referred to as the inner plates. The inner pair of plates 121 and 122 will serve primarily to support the knife and the shear elements as will be set forth hereinafter. Each of the said inner plates 121 and 122 will be mounted for movement toward and away from its corresponding outer plate 123 or 124. The movement of the inner plates 121 and 122 may be automatically controlled by any suitable means such as by hydraulic cylinders and piston rods as indicated. Thus, for example, plate 121 may be automatically moved as desired, toward or away from plate 123. Inner plate 122 may be independently moved toward and away from outer plate 124.

The frame 97' which will be positioned for free lateral movement on rod 126 will be located by automatic means between inner plates 121 and 122. This position may not be in alignment with that shown at the left of FIGS. 9 and 10 to permit free movement of the frames 97 and 97' in non-interfering relationship with the mold halves 93, 94, 95 and 96.

It will be necessary in this position of the parts to remove the surplus material from the formed hollow objects. This may preferably be accomplished by the knife elements and their corresponding parts. As shown in the drawings, several individual knife elements 251, 252, 253 and 254 are provided on one of the inner plates 122 in such a manner as to surround each of the formed hollow objects. When the plates 122 move away from the outer plate 124 the said knife elements 251, 252, 253 and 254 will approach the frame 97' and therefore the finished hollow objects thereon with the surplus or excess material. Simultaneously, the other inner plate 121 with the corresponding slide elements 256 mounted thereon will approach the frame 97' retaining the finished hollow articles by their excess or surplus material. Each of the knife elements 251, 252, 253 and 254 will have at least one slide element 256 in alignment therewith.

Thus, when the plates 121 and 122 approach each other and are extended a maximum distance from their corresponding outer plates 123 and 124, they will cutoff the excess or surplus material as shown most clearly in FIG. 11. The slide elements 256 may each be fabricated of a somewhat flexible material for ease of bending. As each of the knife elements, for example 251 in FIG. 11, approaches its corresponding slide element 256, it will shear off the excess or surplus material along the periphery of the finished hollow object. As this excess or surplus material retains the assembly to the frame 97', the cutting off of the surplus material will permit the finished hollow object to fall free of the assembly and be collected as in a bin for later use. After the ejection of the finished product, the inner plates 121 and 122 may be separated and the frame 97' may be rotated about the rod 120 to be returned to the mold halves 93, 94, 95 and 96 for the operation of the next cycle. Prior to the movement of the frame 97' to the area of the mold halves 93 to 96, the said frame 97' will be laterally to one side as on the bar 126 to permit free movement of the extruded tubes 91 and 92 to the area between the open mold halves 93 and 95, and 94 and 96. When the extruded tubes are in position, the frame 97 or 97' will be moved to the area between the molds to commence the next cycle as set forth heretofore. The knife elements 251, 252, 253 and 254 are assembled on the inner plates 122 and the slide elements 256 are assembled on the plate 121 in an easily adjustable and removable manner as by screws or the like. This permits these elements to be easily changed and adjusted to correspond to any shape of hollow object being formed. The knife elements may be relatively short as for example, 251 or may be relatively long to cover an area of the finished hollow objects as for example, knife elements 252 and 253.

The gliding motion of the slide elements 256 over the knife elements 251, 252, 253 and 254 will insure the entire and uniform removal of the bridge connecting the hollow object to the surplus material. Eject bars for example, 127 and 128 may be provided passing through suitable openings in the inner plates 121 and 122 to insure the removal and automatic eject of the finished hollow objects after the surplus or excess material is removed. The eject bars 127 and 128 may be in a similar manner secured as by screws or the like.

It will be seen then that there is provided herein several embodiments of an apparatus for accomplishing results never before obtainable in the blow-molding art. Not only will hollow objects be produced without surplus or excess material attached thereto which must subsequently be removed by a manual operations, but the molding cycle itself may be accelerated. This is, of course, accomplished by the cobling of the hollow objects when away from the molds by grasping the said hollow object by its surplus or excess material.

While there are above disclosed but a limited number of embodiments of the structure and product of the invention herein presented, it is possible to produce still other embodiments without departing from the inventive concept herein disclosed, and it is desired, therefore, that only such limitations be imposed on the appended claims as are stated therein or required by the prior art.

Having thus described my invention and illustrated its use, what I claim as new and desire to secure by Letters Patent is:

1. A device for the blow-molding of hollow objects comprising, a pair of facing mold parts having complementary cavities on their facing sides and mounted for movement into and out of facing spaced relation with each other for receiving a parison between said mold parts to be expanded into said cavities, cutting edges projecting from the facing sides of said mold parts conformably bounding said cavities and movable with said mold parts into cutting engagement with each other for severing the surplus parison material externally of said cavities from the blown material in said cavities, said mold parts meeting at their respective cutting edges thus leaving a space between said mold parts external of the cavities, and a plurality of apertured plates on opposite facing sides of said mold parts encircling said cavities and mounted for movement transversely to the direction of the movement of said mold parts into and out of the said space between said mold parts externally of said cutting edges, for removing the surplus parison material from between said mold parts.

2. A device for the production of hollow objects as set forth in claim 1, said apertured plates being movable with said mold parts upon movement of the latter toward each other, and being movable transversely out of the space between said mold parts prior to movement of said mold parts away from each other.

3. A device for the production of hollow objects as set forth in claim 1, further including shearing means to sever the said surplus material from the said mold cutting edges.

4. A device for the production of hollow objects as set forth in claim 1, further including wiping means to remove the said surplus material from the said plates.

References Cited by the Examiner

UNITED STATES PATENTS

| | | | |
|---|---|---|---|
| 2,743,478 | 5/1956 | Harlow et al. | 18—5 |
| 2,890,483 | 6/1959 | Soubier | 18—5 |
| 2,994,103 | 8/1961 | Schaich. | |
| 3,021,570 | 2/1962 | Podesra | 264—325 |
| 3,081,489 | 3/1963 | Jackson | 18—5 |
| 3,116,516 | 1/1964 | Molson | 18—5 |
| 3,127,461 | 3/1964 | Blume | 264—325 |
| 3,141,196 | 7/1964 | Langecker | 18—5 X |
| 3,142,089 | 7/1964 | Wilkalis et al. | 18—5 |
| 3,186,029 | 6/1965 | Joseph | 18—5.3 |
| 3,193,367 | 7/1965 | Giffen | 18—19 X |
| 3,209,400 | 10/1965 | DiSettembrini | 18—5 |

FOREIGN PATENTS

| | | |
|---|---|---|
| 221,038 | 3/1958 | Australia. |
| 5,738 | 6/1962 | Japan. |

J. SPENCER OVERHOLSER, *Primary Examiner.*
ROBERT F. WHITE, *Examiner.*
W. L. McBAY, *Assistant Examiner.*